United States Patent
Suzuki

(10) Patent No.: US 12,532,128 B2
(45) Date of Patent: Jan. 20, 2026

(54) LAMINATED STRUCTURE AND METHOD OF MANUFACTURING LAMINATED STRUCTURE

(71) Applicant: ROHM CO., LTD., Kyoto (JP)

(72) Inventor: Tatsuya Suzuki, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 362 days.

(21) Appl. No.: 18/296,136

(22) Filed: Apr. 5, 2023

(65) Prior Publication Data

US 2023/0239632 A1 Jul. 27, 2023

Related U.S. Application Data

(63) Continuation of application No. PCT/JP2021/035505, filed on Sep. 28, 2021.

(30) Foreign Application Priority Data

Oct. 9, 2020 (JP) ................................ 2020-171315

(51) Int. Cl.
*H04R 17/00* (2006.01)
*B81B 3/00* (2006.01)
(Continued)

(52) U.S. Cl.
CPC ........... *H04R 17/00* (2013.01); *B81B 3/0056* (2013.01); *H04R 19/005* (2013.01); *H04R 19/02* (2013.01);
(Continued)

(58) Field of Classification Search
CPC ...... H04R 17/00; H04R 19/005; H04R 19/02; H04R 19/04; H04R 31/00;
(Continued)

(56) References Cited

U.S. PATENT DOCUMENTS

2009/0154734 A1* 6/2009 Jeong .................. H04R 19/005
438/51
2011/0215672 A1* 9/2011 Yamaoka .............. B81B 3/0072
310/300
(Continued)

FOREIGN PATENT DOCUMENTS

| JP | 2010-114776 | 5/2010 |
| JP | 2013-168810 | 8/2013 |
| WO | 2018/061805 | 4/2018 |

OTHER PUBLICATIONS

International Search Report of PCT/JP2021/035505, Nov. 22, 2021, 7 pages including English translation.
(Continued)

*Primary Examiner* — Angelica M Mckinney
(74) *Attorney, Agent, or Firm* — HSML P.C.

(57) ABSTRACT

A laminated structure includes a frame body having a first surface and a second surface facing in mutually opposite directions in a thickness direction, the frame body including a film body supported by the frame body and a hollow portion opening at the second surface and being located between the film body and the second surface; and a lid body attached to the frame body, including cavity located on the film body and an opening which communicates with the cavity and being formed at a positon at which at least a part of the film body is exposed to an external space of the laminated structure. The lid body includes a groove portion formed in a surface (a back surface) of the lid body facing the frame body, and the cavity and the external space of the laminated structure communicate with each other through the groove portion.

16 Claims, 14 Drawing Sheets

(51) Int. Cl.
*H04R 19/00* (2006.01)
*H04R 19/02* (2006.01)
*H04R 19/04* (2006.01)
*H04R 31/00* (2006.01)

(52) U.S. Cl.
CPC ............ *H04R 19/04* (2013.01); *H04R 31/00* (2013.01); *H04R 2201/003* (2013.01)

(58) Field of Classification Search
CPC ............ H04R 2201/003; H04R 31/003; B81B 3/0056; B81B 2201/0257; B81C 1/00309
See application file for complete search history.

(56) References Cited

U.S. PATENT DOCUMENTS

| | | | | |
|---|---|---|---|---|
| 2013/0243234 | A1* | 9/2013 | Zoellin | H04R 19/04 381/369 |
| 2014/0306299 | A1* | 10/2014 | Kasai | H04R 31/006 257/416 |

OTHER PUBLICATIONS

Japanese Office Action issued in Japanese Patent Application No. 2022-555377, dated Apr. 22, 2025, 8 pages, English machine translation.

\* cited by examiner

LAMINATED STRUCTURE AND METHOD OF MANUFACTURING LAMINATED STRUCTURE

CROSS REFERENCE TO RELATED APPLICATIONS

This application is a continuation application of International Application No. PCT/JP2021/035505, now WO2022/075114, filed on Sep. 28, 2021, which claims priority to Japanese Patent Application No. 2020-171315, filed on Oct. 9, 2020, the entire contents of which are incorporated by reference herein.

BACKGROUND OF THE INVENTION

Technical Field

The embodiments herein relate to a laminated structure in which a material containing silicon is laminated and a method of manufacturing the laminated structure.

Background

A transducer is known as one of a variety of micro-electro-mechanical systems (MEMS) manufactured by using semiconductor manufacturing processes. A MEMS transducer includes a piezoelectric element and a film body driven by means of the piezoelectric element, and is housed in a case of a portable electronic device or the like as a speaker or microphone (see WO 2018/061805 for example).

SUMMARY OF THE INVENTION

A MEMS film body is formed by etching a semiconductor substrate until the film body obtains the desired thickness. With this etching, a film body and a hollow, which are aligned in the thickness direction of the semiconductor substrate, are simultaneously formed in the semiconductor substrate. Meanwhile, when performing this etching, there is a case in which a cavity has been formed on the opposite side to the part to be etched (that is, the part where the hollow is formed) with the film body of the semiconductor substrate therebetween. This cavity is a space ensured for disposing a piezoelectric element or the like to the film body, and is formed on another semiconductor substrate attached to the semiconductor substrate to be etched, for example.

The film body formed by means of etching is very thin. That is, there is a concern that during the formation of the film body by means of etching, the film between the cavity and the etched part may become thin, and the film may be broken due to the stress of the film or the pressure difference between the cavity and the external space of the semiconductor substrate.

An object of the embodiments herein is to provide a laminated structure and a method of manufacturing the laminated structure that can suppress the breakage of a film body during the formation of the film body.

One aspect of the embodiments herein provides a laminated structure in which a material containing silicon is laminated, the laminated structure including: a frame body having a first surface and a second surface facing in mutually opposite directions in a thickness direction, the frame body including a film body supported by the frame body and a hollow portion opening at the second surface and located between the film body and the second surface; and a lid body attached to the frame body, the lid body including a cavity located on the film body and an opening which communicates with the cavity, the opening being formed at a position at which at least a part of the film body is exposed to an external space of the laminated structure, wherein the lid body includes a groove portion formed in a surface of the lid body facing the frame body, and the cavity and the external space of the laminated structure communicate with each other through the groove portion.

Another aspect of the embodiments herein provides a method of manufacturing a laminated structure in which a material containing silicon is laminated, the method of manufacturing a laminated structure including: attaching a lid body to a frame body while a cavity formed in the lid body faces the frame body; attaching a support substrate to the lid body; and forming a film body at the frame body by etching a second surface of the frame body while a gas is allowed to flow between the cavity and an external space of the laminated structure, the second surface facing in a direction in a thickness direction of the frame body opposite to a facing direction of a first surface to which the lid body is attached.

According to the embodiments herein, it is possible to provide a laminated structure and a method of manufacturing the laminated structure that can suppress the breakage of a film body during the formation of the film body.

DESCRIPTION OF THE EMBODIMENTS

Figure 1A:
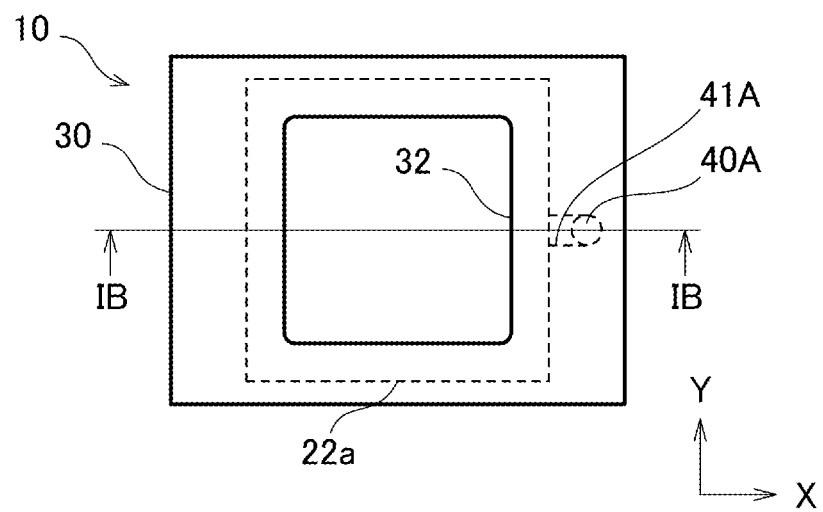
FIG. 1A is a top view of a laminated structure according to a first embodiment.

Embodiments will be described using drawings. Structurally or functionally identical parts in each embodiment are denoted by the same reference numerals in the drawings, and overlapping explanations regarding such parts are omitted.

A laminated structure according to each embodiment is a micro-electro-mechanical systems (MEMS) structure having a film body configured to be displaceable (flexible, strainable). The laminated structure can be applied to a speaker and a microphone that use a piezoelectric element to control or detect the displacement (flexure, strain) of the film body, and a transducer such as a pressure sensor that measures the electrical resistance of the film body in response to the displacement (flexure, strain) of the film body.

First Embodiment

The configuration of a laminated structure 10 according to a first embodiment will be described.

Figure 1B:
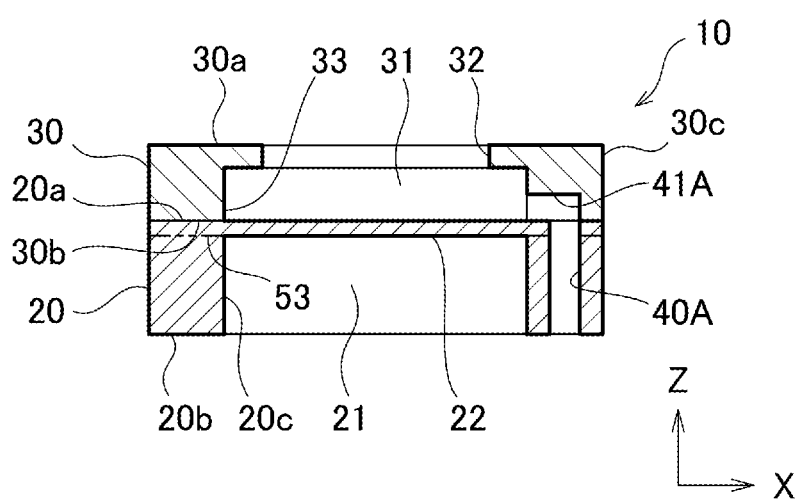
FIG. 1B is a cross-sectional view of the laminated structure which is taken along line IB-IB in FIG. 1A.

FIG. 1A is a top view of the laminated structure 10 according to the first embodiment, and FIG. 1B is a cross-sectional view of the laminated structure which is taken along line IB-IB in FIG. 1A. As shown in FIGS. 1A and 1B, the laminated structure 10 has a frame body 20, a lid body 30, and an air passage 40A. The frame body 20 and lid body 30 are made from a material containing silicon (Si), for example. For convenience of the explanation, a direction in which the frame body 20 and lid body 30 are arranged (in other words, the direction in which the frame body 20 and lid body 30 are laminated to each other) is defined as a Z direction, and two directions which are perpendicular to the Z direction and are perpendicular to each other are defined as X and Y directions.

The frame body 20 has a front surface (a first surface) 20a and a back surface (a second surface) 20b, which face in mutually opposite directions in the Z direction. The frame body 20 has a rectangular outline that expands in the X and Y directions, for example. The frame body 20 has a hollow portion (first space) 21, which is located between a film body 22 and the back surface 20b and opens on the back surface 20b. This hollow portion 21 is formed with an inner surface 20c of the frame body 20. The frame body 20 is formed of a silicon-on-insulator (SOI) wafer 50 (see FIG. 2A). The SOI wafer 50 includes an active layer 51 where the film body 22 is formed, a support layer 52 where the hollow portion 21 is formed, and an interlayer insulating layer 53 formed at the boundary between the active layer 51 and the support layer 52. The wafer forming the frame body 20 is not limited to the SOI wafer and may be a wafer without the interlayer insulating layer 53.

The frame body 20 includes the film body 22. The film body 22 is located at the same height as the front surface 20a in the Z direction, for example. In this case, the surface facing the lid body 30 is continuous with the front surface 20a of the frame body 20. Further, the film body 22 is supported by the frame body 20 and covers at least a part of the hollow portion 21. The film body 22 is a thin film that expands in the X and Y directions and has a thickness (for example, 2 to 3 µm) which makes the film body 22 displaceable (flexible, strainable) in the Z direction. The thickness of the film body 22 may be equal to or less than the thickness of the active layer 51 of the SOI wafer.

The film body 22 is formed by etching the back surface 20b of the frame body 20. The film body 22 is supported by the inner surface 20c forming the hollow portion 21, between the hollow portion 21 formed by means of etching and a cavity (second space) 31 of the lid body 30. The film body 22 is formed integrally with the frame body 20. In addition, an outer edge 22a of the film body 22 is supported by the frame body 20 along the whole circumference. Alternatively, as described later, only a part of the outer edge 22a of the film body 22 may be supported by the frame body 20.

The lid body 30 is attached on the front surface 20a of the frame body 20, and the lid body 30 is integrated with the frame body 20. Further, the lid body 30 has the cavity 31 located above the film body 22. The lid body 30 has an opening 32 formed in the front surface 30a of the lid body 30 and an opening 33 formed in a back surface 30b of the lid body 30, and these openings communicate with the cavity 31. That is, the cavity 31 penetrates through the lid body 30 in the Z direction. The opening 32 is formed at a position where at least a part of the film body 22 is exposed to the external space of the laminated structure 10. In other words, when viewed from the Z direction, at least a part of the opening 32 and at least a part of the film body 22 overlap each other. The opening area of the opening 32 is smaller than the area of the film body 22 and the opening area of the opening 33 is larger than the area of the film body 22. Similar to the frame body 20, the lid body 30 may also be formed from a silicon wafer.

The cavity 31 communicates with the external space of the laminated structure 10 through a groove portion 41A. In the present embodiment, the cavity 31 communicates with the external space of the laminated structure 10 through the groove portion 41A and the air passage 40A. The groove portion 41A is formed in the surface (hereinafter referred to as a back surface) 30b of the lid body 30 facing the front surface 20a of the frame body 20 and opens toward the front surface 20a and the cavity 31. As shown in FIG. 1B, the groove portion 41A extends along the back surface 30b of the lid body 30 from the cavity 31 to a predetermined position in the back surface 30b. That is, the groove portion 41A does not reach a side surface 30c of the lid body 30. Further, the air passage 40A extends from the predetermined position to the back surface 20b of the frame body 20, and opens at the back surface 20b. That is, the air passage 40A passes through the frame body 20 along the Z direction.

Next, a method of manufacturing the laminated structure 10 according to the present embodiment will be described.

FIGS. 2A to 2H are diagrams showing the main processes of the manufacturing method according to the present embodiment. The laminated structure 10 is manufactured with the frame body 20, the lid body 30, and a support substrate 60. The frame body 20 and lid body 30 are formed of individual silicon wafers. The SOI wafer described above is used for the silicon wafer forming the frame body 20. Further, the cavity 31 and groove portion 41A are preformed in the lid body 30 by means of microfabrication such as etching. Depending on a use of the laminated structure 10, various processes such as the formation of electrodes, wiring layers, and elements such as piezoelectric elements, ion implantation, and the formation or removal of resists and protective films are appropriately performed.

Figure 2A:
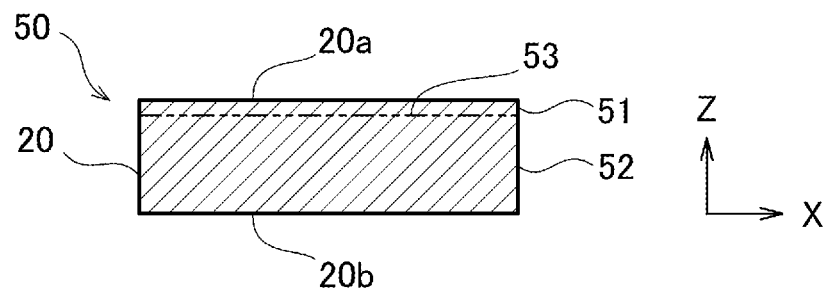
FIG. 2A is a diagram showing one process of a method of manufacturing a laminated structure according to a first embodiment.
Figure 2B:
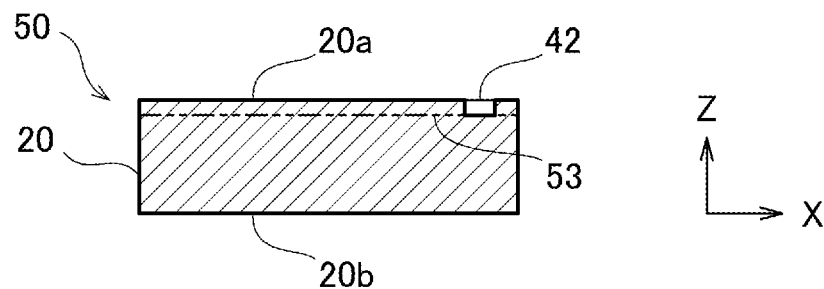
FIG. 2B is a diagram showing one process of the method of manufacturing the laminated structure according to the first embodiment.

First, as shown in FIGS. 2A and 2B, the active layer 51 is etched from the front surface 20a of the frame body 20 and a bottomed hole 42 that becomes a part of the air passage 40A is formed (step SA1). This etching is performed until the bottomed hole 42 has a predetermined depth (for example, a depth at which the hole reaches the interlayer insulating layer 53). If an SOI wafer is not used, this process may be omitted.

Figure 2C:
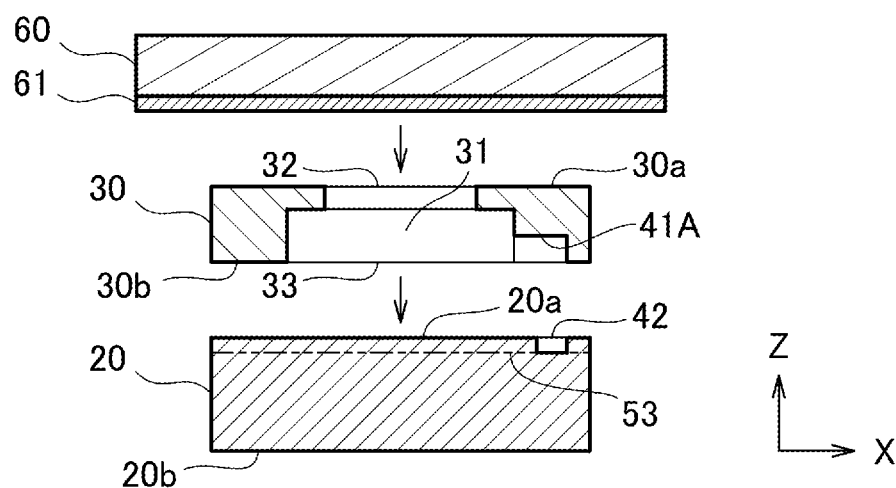
FIG. 2C is a diagram showing one process of the method of manufacturing the laminated structure according to the first embodiment.
Figure 2D:
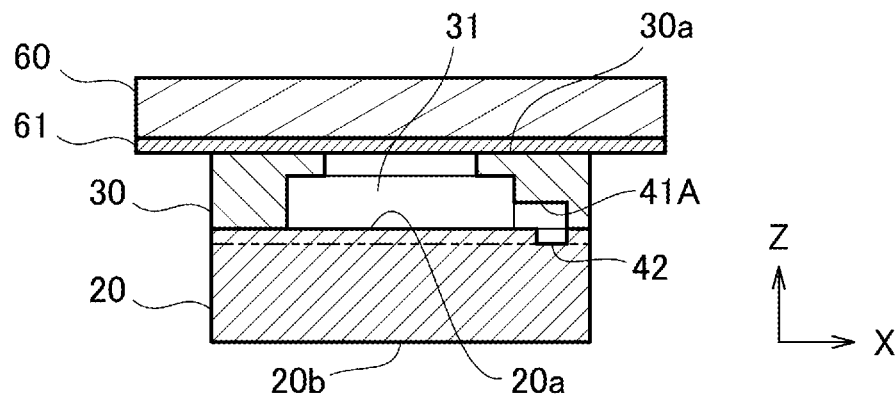
FIG. 2D is a diagram showing one process of the method of manufacturing the laminated structure according to the first embodiment.

Next, as shown in FIGS. 2C and 2D, the lid body 30 is attached on the front surface 20a of the frame body 20 while the opening 33 of the cavity 31 faces the frame body 20 (step SA2). At this time, the lid body 30 is positioned relative to the frame body 20 such that the groove portion 41A is located at the position of the bottomed hole 42. Next, the support substrate 60 is attached on the front surface 30a of the lid body 30 (step SA3).

An adhesive member 61 such as an adhesive tape is provided on the support substrate 60. The support substrate 60 supports the lid body 30 with the adhesive member 61 therebetween. At this time, the opening 32 of the cavity 31 is closed by the support substrate 60, and therefore the flow of gas between the cavity 31 and the external space of the laminated structure 10 is restricted.

Figure 2E:
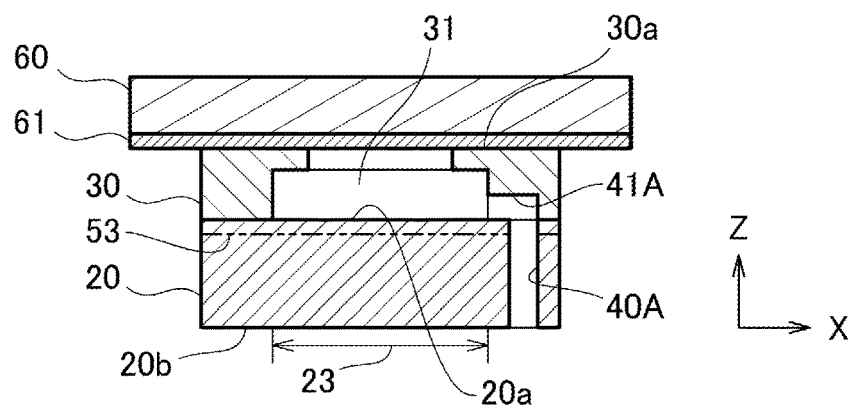
FIG. 2E is a diagram showing one process of the method of manufacturing the laminated structure according to the first embodiment.

Next, as shown in FIG. 2E, before the formation of the film body 22, a portion in the back surface 20b of the frame body 20 corresponding to the groove portion 41A (the portion corresponding to the bottomed hole 42 if the process of step SA1 is performed) is etched and the air passage 40A is formed (step SA4). With the formation of the air passage 40A, the cavity 31 and the external space of the laminated structure 10 communicate with each other, and accordingly the flow of gas therebetween is allowed.

Figure 2F:
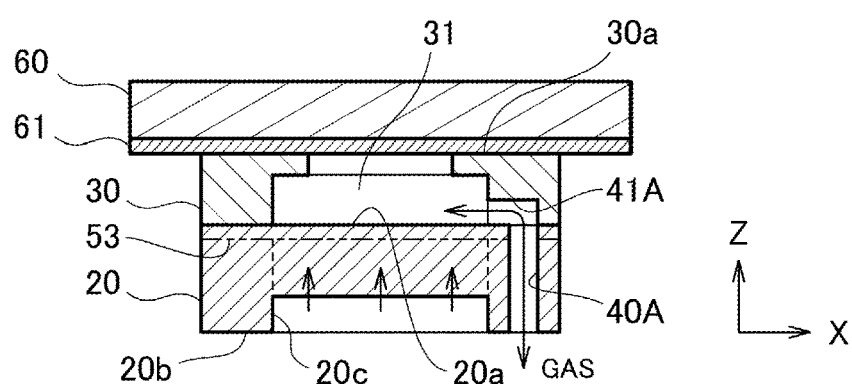
FIG. 2F is a diagram showing one process of the method of manufacturing the laminated structure according to the first embodiment.
Figure 2G:
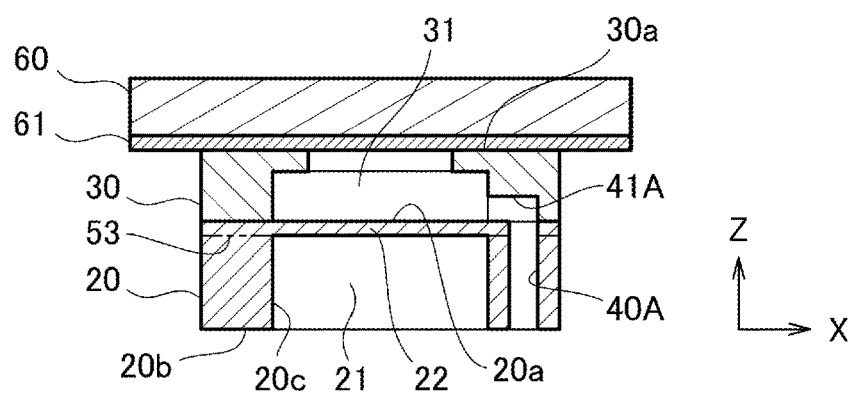
FIG. 2G is a diagram showing one process of the method of manufacturing the laminated structure according to the first embodiment.

Next, as shown in FIGS. 2F and 2G, an area 23 (see FIG. 2E) of the back surface 20b of the frame body 20 corresponding to the cavity 31 is etched (step SA5). The etching is continued until the thickness of the film body 22 has a desired value (in other words, etching is continued until the depth of the hollow portion 21 in the Z direction has the desired value.). For example, the etching is continued until the interlayer insulating layer 53 is exposed in the hollow portion 21 or until the interlayer insulating layer 53 is removed.

There is a concern that the pressure difference between the cavity 31 and the etching atmosphere may become excessive while the etching in step SA5 is performed. However, in the present embodiment, the flow of gas between the cavity 31 and the external space of the laminated structure 10 is allowed through the groove portion 41A and the air passage 40A. This can reduce the pressure difference between the cavity 31 and the external space of the laminated structure 10 and suppress the breakage of the film body 22 due to the excessive pressure difference during the formation of the film body 22. As a result, it is possible to further reduce the thickness of the film body 22 compared to a conventional value, or enlarge the area of the film body 22 compared to a conventional value.

Figure 2H:
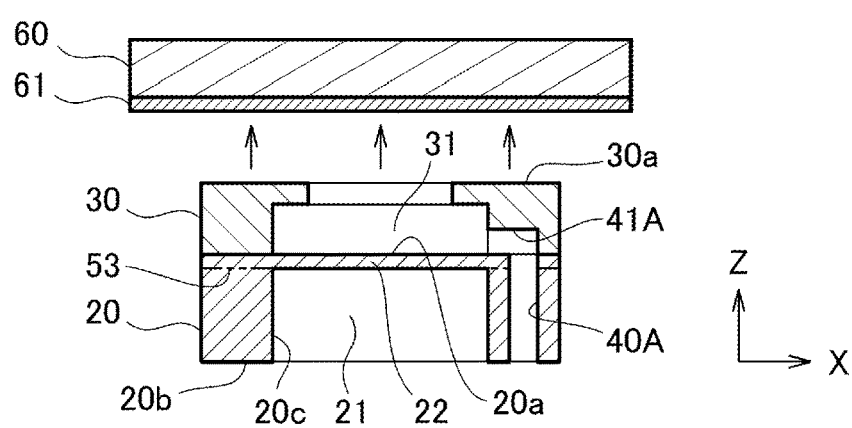
FIG. 2H is a diagram showing one process of the method of manufacturing the laminated structure according to the first embodiment.

Next, as shown in FIG. 2H, the support substrate 60 is removed from the lid body 30 (step SA6), and the manufacturing processes according to the present embodiment is finished. Even when the support substrate 60 is removed from the lid body 30, the flow of gas between the cavity 31 and the external space of the laminated structure 10 is allowed through the air passage 40A. Therefore, even in the process of step SA6, the breakage of the film body 22 can be suppressed and the support substrate 60 can be safely removed.

Second Embodiment

The configuration of the laminated structure 10 according to a second embodiment will be described.

Figure 3A:
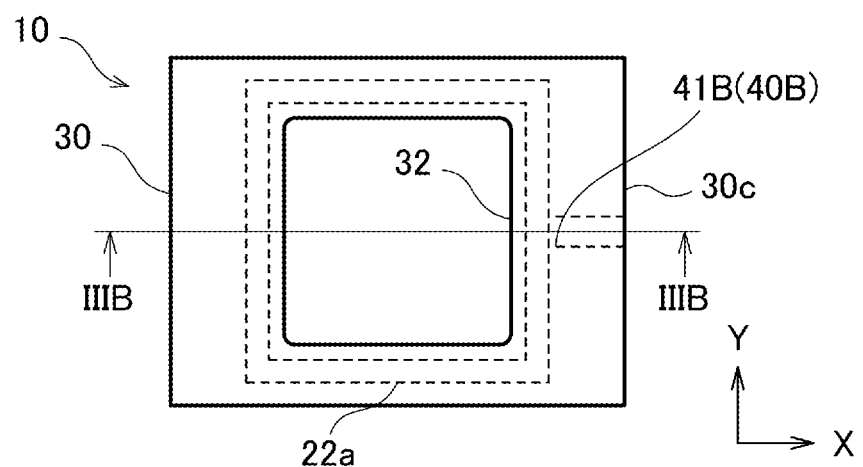
FIG. 3A is a top view of a laminated structure according to a second embodiment.
Figure 3B:
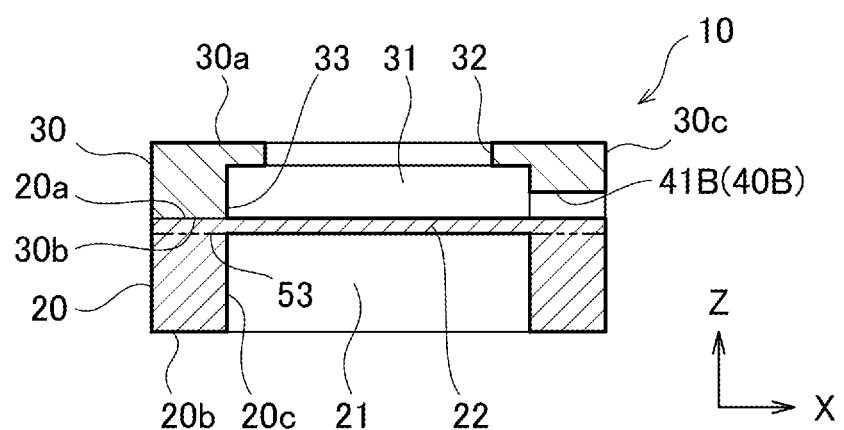
FIG. 3B is a cross-sectional view of the laminated structure which is taken along line IIIB-IIIB in FIG. 3A.

FIG. 3A is a top view of the laminated structure 10 according to the second embodiment, and FIG. 3B is a cross-sectional view of the laminated structure 10 which is taken along line IIIB-IIIB in FIG. 3A. As shown in these diagrams, in the second embodiment, a groove portion 41B is formed instead of the groove portion 41A. In the present embodiment, the cavity 31 communicates with the external space of the laminated structure 10 through the groove portion 41B.

As in the first embodiment, the groove portion 41B according to the second embodiment is formed on the back surface 30b of the lid body 30. However, as shown in FIG. 3B, the groove portion 41B extends from the cavity 31 to the external space of the laminated structure 10. That is, the groove portion 41B opens at the side surface 30c of the lid body 30 and forms an air passage 40B. That is, the air passage 40B is formed only in the lid body 30. Similar to the air passage 40A, the air passage 40B also allows the flow of gas between the cavity 31 and the external space of the laminated structure 10 during the formation of the film body 22.

Next, a method of manufacturing the laminated structure 10 according to the present embodiment will be described.

Figure 4A:
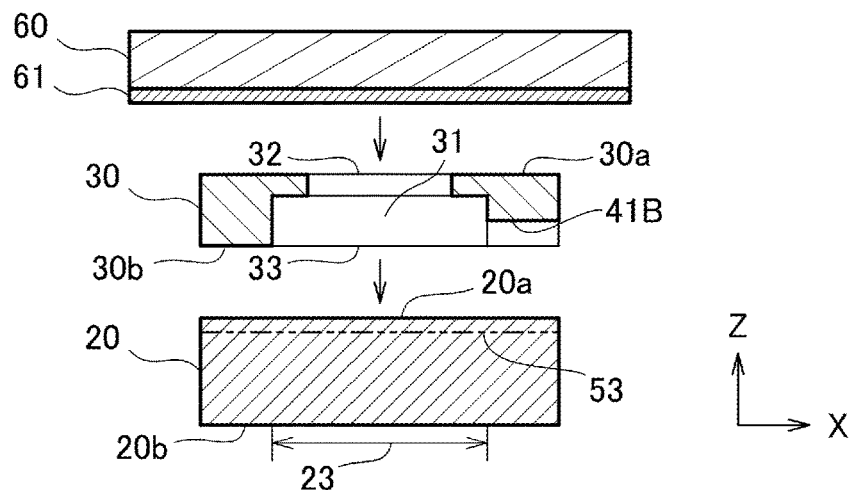
FIG. 4A is a diagram showing one process of a method of manufacturing the laminated structure according to the second embodiment.

FIGS. 4A to 4D are diagrams showing the main processes of the manufacturing method according to the present embodiment. The manufacturing method according to the present embodiment is almost identical to the manufacturing method according to the first embodiment. That is, as shown in FIG. 4A, the lid body 30 is attached on a front surface (a first surface) 20a of the frame body 20 while the opening 33 of the cavity 31 faces the frame body 20 (step SB1), and then the support substrate 60 is attached on the front surface 30a of the lid body 30 (step SB2).

Figure 4B:
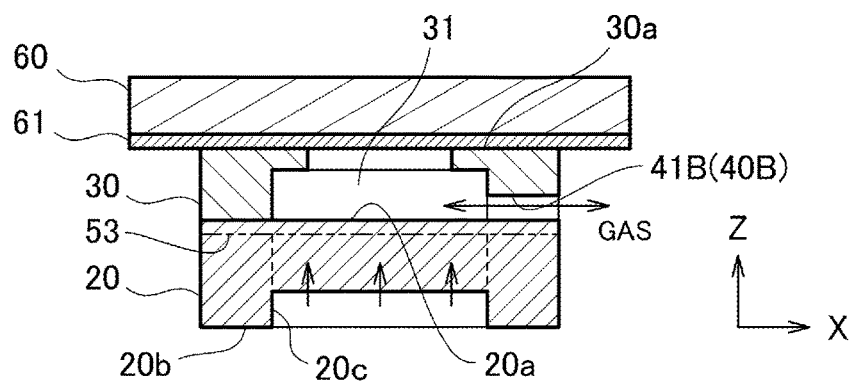
FIG. 4B is a diagram showing one process of the method of manufacturing the laminated structure according to the second embodiment.
Figure 4C:
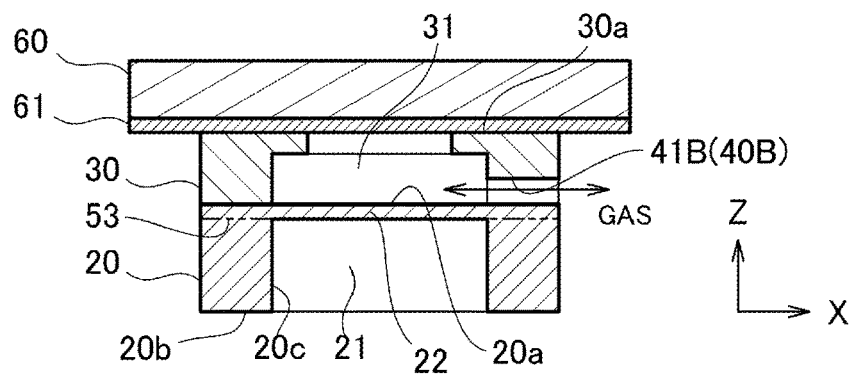
FIG. 4C is a diagram showing one process of the method of manufacturing the laminated structure according to the second embodiment.
Figure 4D:
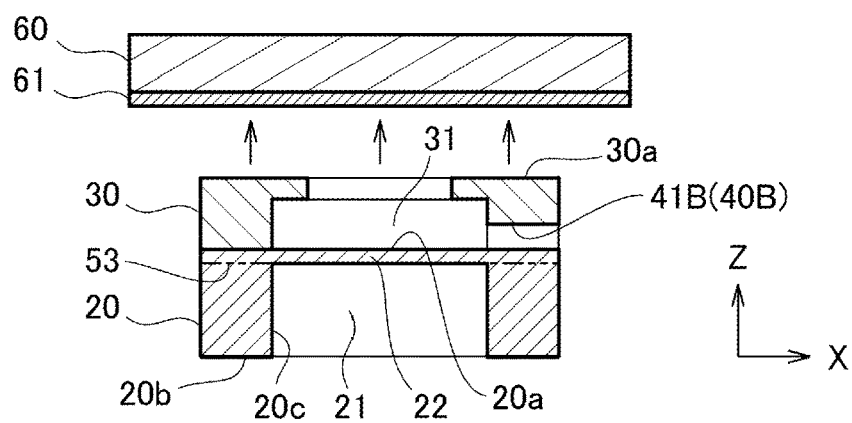
FIG. 4D is a diagram showing one process of the method of manufacturing the laminated structure according to the second embodiment.

Next, as shown in FIGS. 4B and 4C, an area 23 of a back surface (a second surface) 20b of the frame body 20 corresponding to the cavity 31 is etched (step SB3). The process of step SB3 is the same as that of step SA5. After the film body 22 is formed by means of the etching in step SB3, the support substrate 60 is removed from the lid body 30 (step SB4) as shown in FIG. 4D. The process of step SB4 is the same as that of step SA6.

In the process of step SB2, the opening 32 of the cavity 31 is closed by the support substrate 60. However, since the groove portion 41B is formed in advance in the lid body 30, the flow of gas between the cavity 31 and the external space of the laminated structure 10 is allowed and maintained. Therefore, compared with the manufacturing method according to the first embodiment, the manufacturing method of the second embodiment can omit the processes of step SA1 for forming the bottomed hole 42 in the frame body 20 and step SA3 for forming the air passage 40A.

In the manufacturing method according to the present embodiment also, as in the first embodiment, it is possible to suppress the breakage of the film body 22 due to an excessive pressure difference during the formation of the film body 22, further reduce the thickness of the film body 22 compared to a conventional value, or enlarge the area of the film body 22 compared to a conventional value.

Third Embodiment

A method of manufacturing the laminated structure 10 according to a third embodiment will be described.

The laminated structure 10 according to the present embodiment does not have the groove portion 41A of the first embodiment and the groove portion 41B of the second embodiment. Instead of these, the manufacturing method of the third embodiment provides the adhesive member 61 and a gap 62 between the front surface 30a of the lid body 30 and the support substrate 60, and ensures the flow of gas between the cavity 31 and the external space of the laminated structure 10 through the gap 62 while the support substrate 60 supports the lid body 30. That is, the gap 62 functions as an air passage 40C similar to the air passage in the first or second embodiment.

Figure 5A:
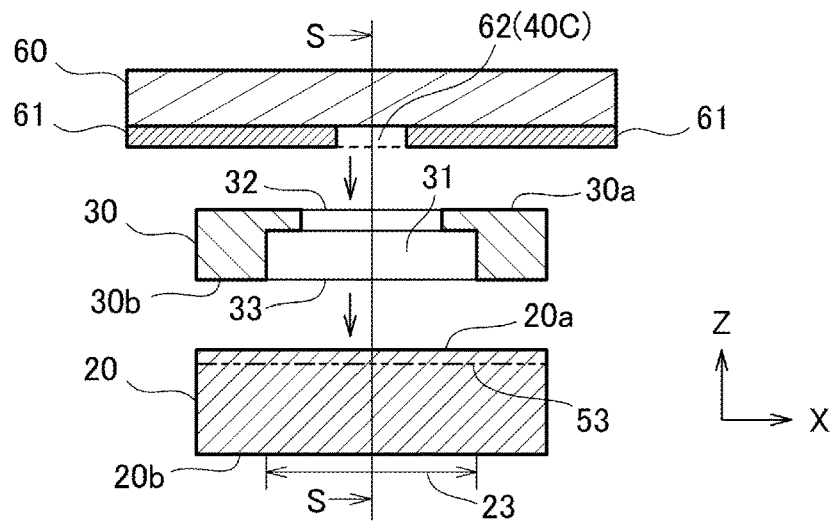
FIG. 5A is a diagram showing one process of the method of manufacturing the laminated structure according to a third embodiment.
Figure 5B:
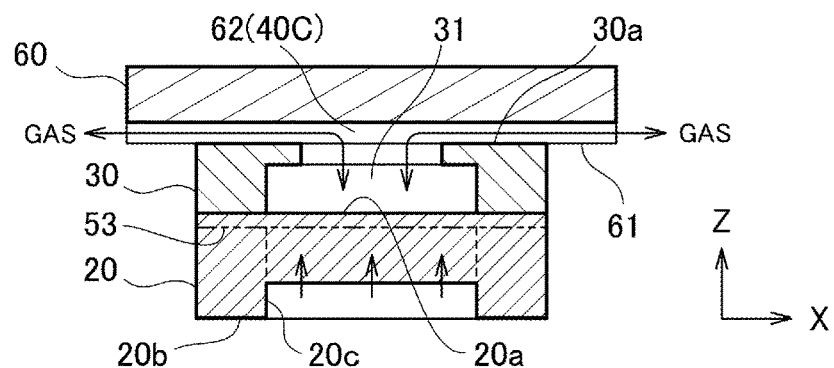
FIG. 5B is a diagram showing one process of the method of manufacturing the laminated structure according to the third embodiment.
Figure 5C:
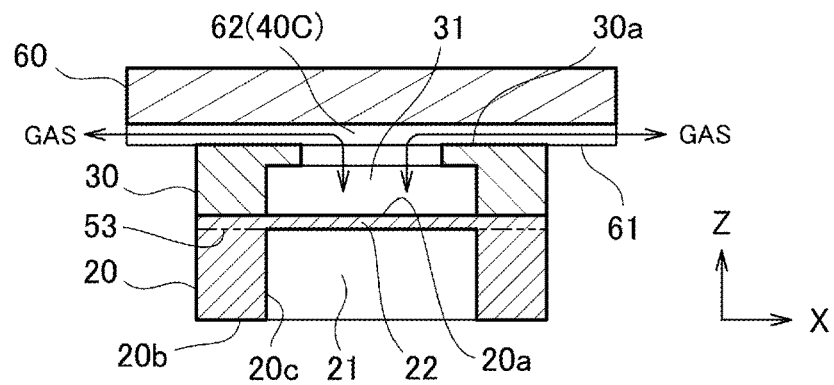
FIG. 5C is a diagram showing one process of the method of manufacturing the laminated structure according to the third embodiment.
Figure 5D:
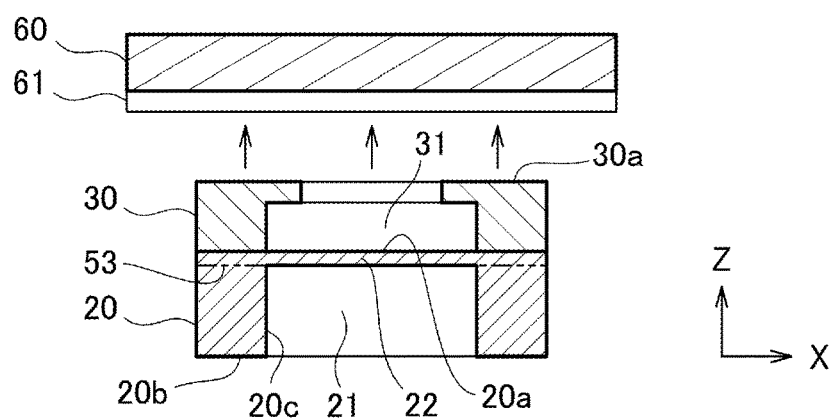
FIG. 5D is a diagram showing one process of the method of manufacturing the laminated structure according to the third embodiment.

FIGS. 5A to 5D are diagrams showing the main processes of the manufacturing method according to the present embodiment. FIGS. 5B to 5D are diagrams of the laminated structure which are taken along cross section S-S in FIG. 5A. As shown in FIG. 5A, the adhesive member 61 and the gap 62 as the air passage 40C are interposed between the front surface 30a of the lid body 30 and the support substrate 60. The gap 62 is formed to communicate with the external space of the laminated structure from the cavity 31. The gap 62 extends in the X direction, for example. Then, as shown in FIGS. 5B and 5C, gas is released from the cavity 31 through the gap 62 in the formation of the film body 22, and the increase in the internal pressure of the cavity 31 is suppressed.

Other processes are the same as those of the manufacturing method according to the first or second embodiment. Therefore, in the manufacturing method of the third embodiment, the process of forming the air passage 40A in the laminated structure 10 can be omitted. In addition, the same effect as the first embodiment described above can be obtained in the present embodiment also.

Fourth Embodiment

The configuration of the laminated structure 10 according to a fourth embodiment will be described.

In the laminated structures 10 according to all of the first to third embodiments, the whole circumference of the outer edge 22a of the film body 22 is supported by the frame body 20. Meanwhile, according to the present embodiment, only a part of the outer edge 22a of the film body 22 is supported by the frame body 20. That is, the film body 22 can operate as a so-called cantilever.

Figure 6A:
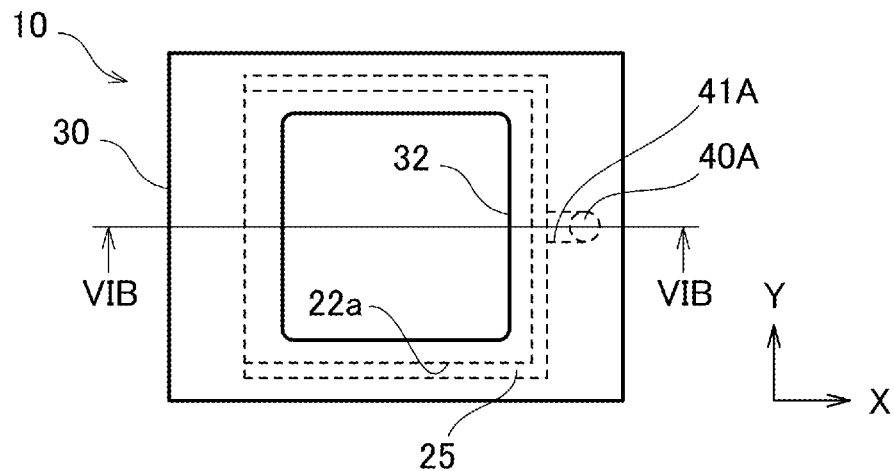
FIG. 6A is a top view of a laminated structure according to a fourth embodiment.
Figure 6B:
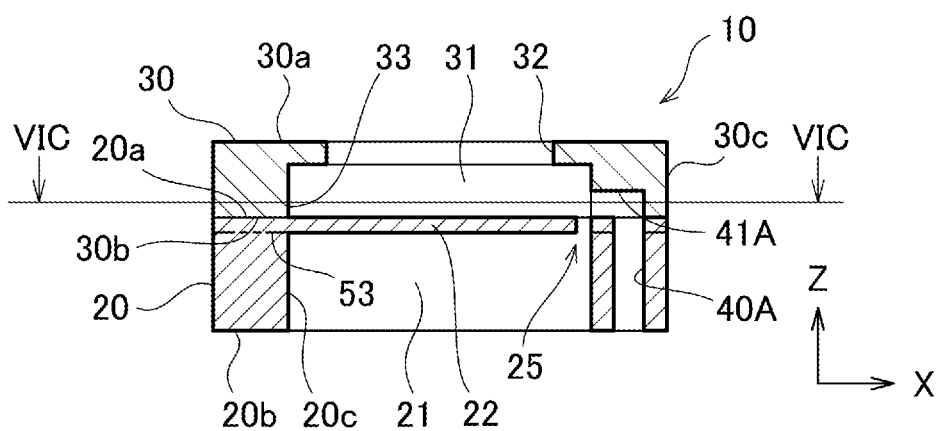
FIG. 6B is a cross-sectional view of the laminated structure which is taken along line VIB-VIB in FIG. 6A.
Figure 6C:
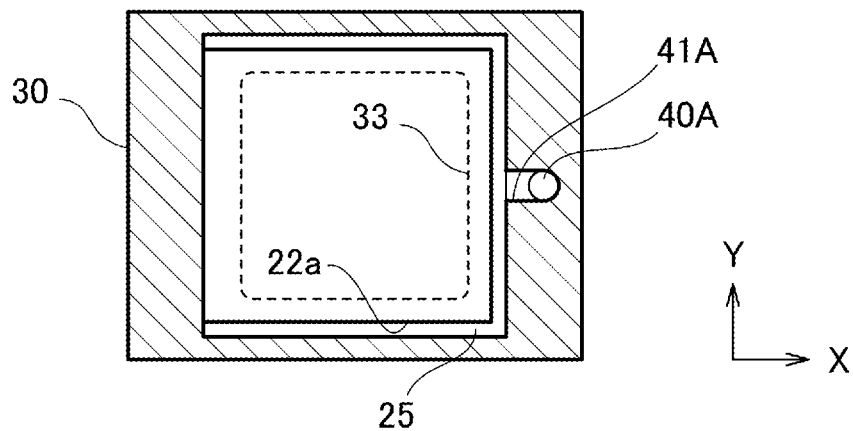
FIG. 6C is a cross-sectional view of the laminated structure which is taken along line VIC-VIC in FIG. 6B.

FIG. 6A is a top view of the laminated structure 10 according to the fourth embodiment and FIG. 6B is a cross-sectional view of the laminated structure which is taken along line VIB-VIB in FIG. 6A. FIG. 6C is a cross-sectional view of the laminated structure which is taken along line VIC-VIC in FIG. 6B. As shown in FIGS. 6A and 6B, the air passage 40A has a groove portion 41B formed in the back surface 30b of the lid body 30, and the cavity 31 and the external space of the laminated structure 10 communicate through the groove portion 41B. In addition, the air passage 40A extends from the groove portion 41B to the back surface 20b of the frame body 20 and opens at the back surface 20b. That is, the configuration of the air passage 40A of the present embodiment is the same as that in the first embodiment.

As shown in FIG. 6C, a slit 25 is formed in a part of the outer circumference of the film body 22 at the frame body 20 (the front surface 20a of the frame body 20). The slit 25 forms the outer edge 22a of the film body 22 and is formed such that only a part of the outer edge 22a of the film body 22 is supported by the frame body 20. For example, when the film body 22 has a rectangular shape extending in the X and Y directions, the outer edges are the total of four sides extending in the X and Y directions, and only one side thereof is supported by the frame body 20. That is, the film body 22 is configured as a cantilever which is flexible in the Z direction.

Compared with the case where the whole circumference of the film body 22 is supported by the frame body 20, the film body 22 of the present embodiment is more likely to be displaced in the Z direction if the film thickness is the same. Therefore, when the film body 22 is driven by using a piezoelectric element, the voltage applied to the piezoelectric element can be reduced, for example. Further, when displacement of the film body 22 due to a change in an external force is to be detected, the sensitivity of the film body 22 relative to the external force is enhanced.

Next, a method of manufacturing the laminated structure 10 according to the present embodiment will be described.

Except for the process of forming the slit 25 described above, each of the manufacturing methods of the first to third embodiments can be applied to the manufacturing method of the present embodiment.

Figure 7A:
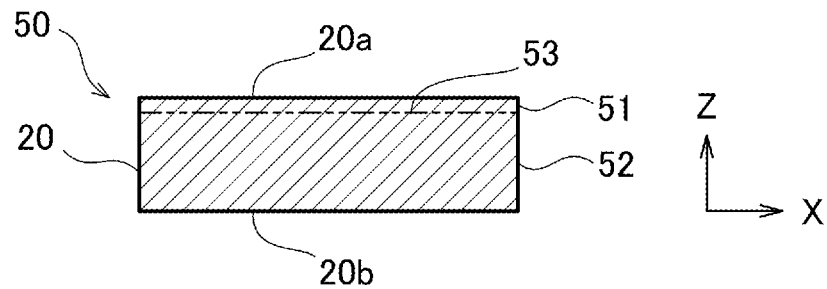
FIG. 7A is a diagram showing one process of a method of manufacturing the laminated structure according to the fourth embodiment.
Figure 7B:
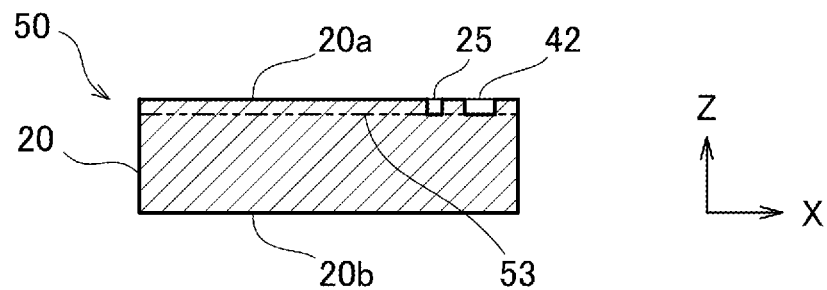
FIG. 7B is a diagram showing one process of the method of manufacturing the laminated structure according to the fourth embodiment.

FIGS. 7A to 7H are diagrams showing the main processes of the manufacturing method according to the present embodiment. For convenience of the explanation, these diagrams show an example which applies the manufacturing method of the first embodiment forming the air passage 40A. That is, as shown in FIGS. 7A and 7B, before the formation of the film body 22, the active layer 51 is etched from the front surface 20a of the frame body 20 and accordingly the slit 25 and the bottomed hole 42 are formed (step SC1). This etching is performed until the slit or hole reaches a depth equal to or greater than the thickness of the film body 22.

Figure 7C:
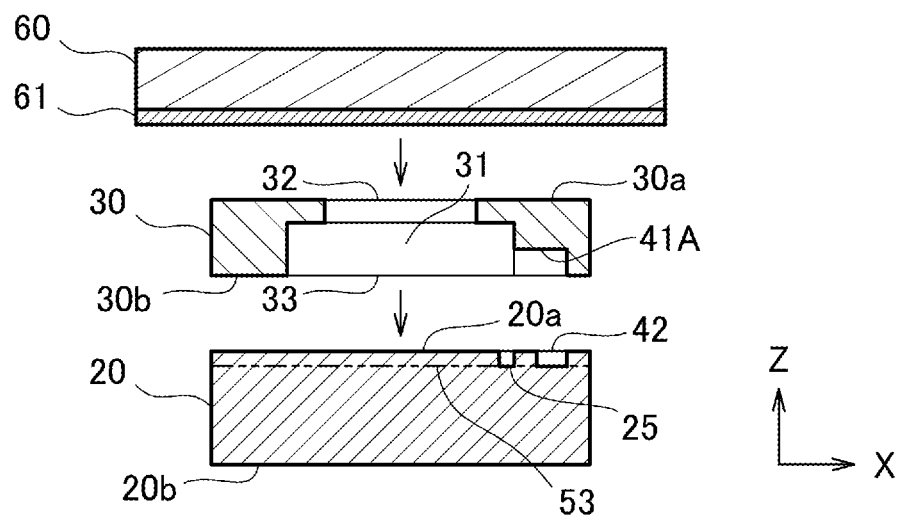
FIG. 7C is a diagram showing one process of the method of manufacturing the laminated structure according to the fourth embodiment.
Figure 7D:
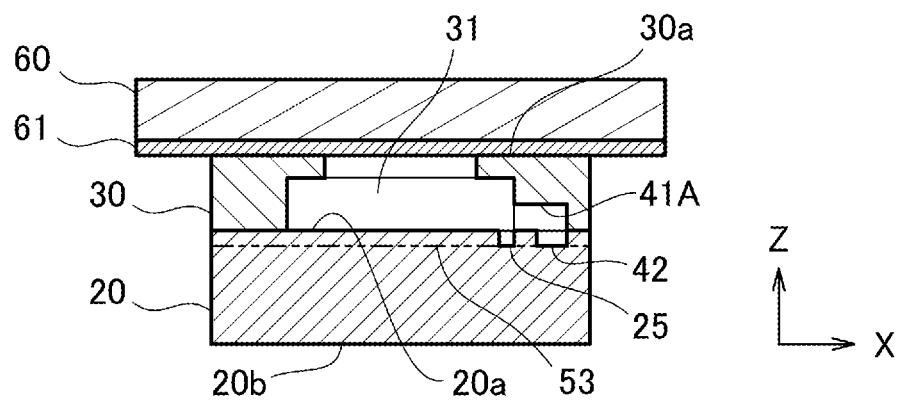
FIG. 7D is a diagram showing one process of the method of manufacturing the laminated structure according to the fourth embodiment.

Next, the lid body 30 is attached on the front surface 20a of the frame body 20 while the opening 33 of the cavity 31 faces the frame body 20 (step SC2) as shown in FIGS. 7C and 7D. At this time, the lid body 30 is positioned relative to the frame body 20 such that the groove portion 41A is located at the position of the bottomed hole 42 and the inner peripheral surface of the cavity 31 is shifted away from the opening surface of the slit 25. Further, the support substrate 60 is attached on the front surface 30a of the lid body 30 (step SC3).

Figure 7E:
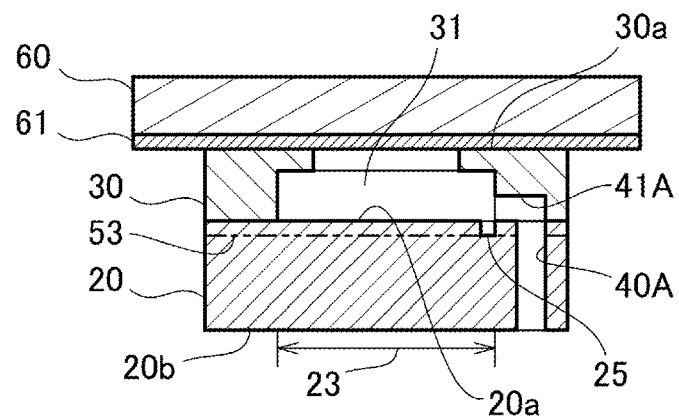
FIG. 7E is a diagram showing one process of the method of manufacturing the laminated structure according to the fourth embodiment.

Next, as shown in FIG. 7E, a portion of the back surface 20b of the frame body 20 corresponding to the groove portion 41A is etched and the air passage 40A is formed (step SC4). By forming the air passage 40A, the cavity 31 and the external space of the laminated structure 10 communicate with each other and the flow of gas therebetween is allowed.

Figure 7F:
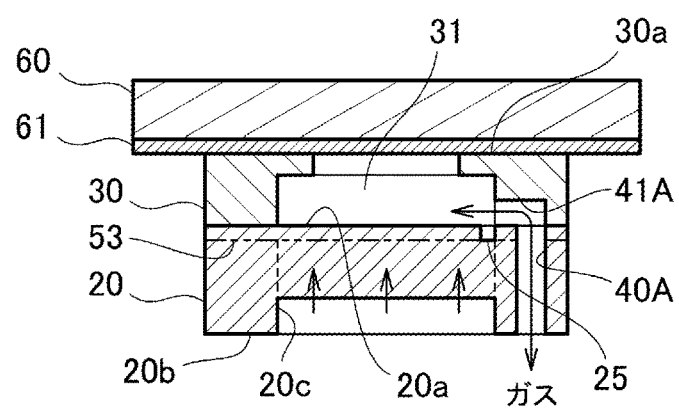
FIG. 7F is a diagram showing one process of the method of manufacturing the laminated structure according to the fourth embodiment.
Figure 7G:
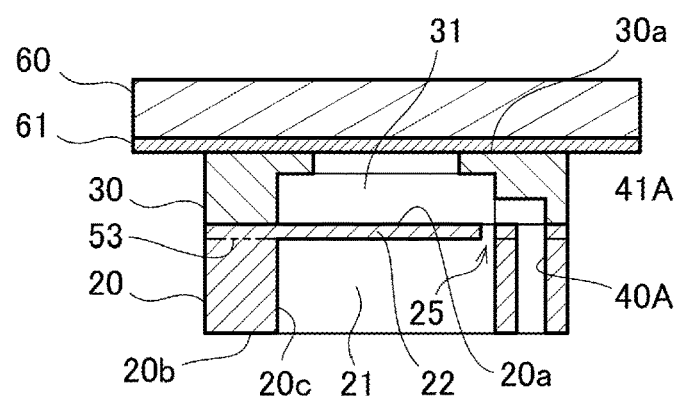
FIG. 7G is a diagram showing one process of the method of manufacturing the laminated structure according to the fourth embodiment.

Next, as shown in FIGS. 7F and 7G, the area 23 (see FIG. 2E) of the back surface 20b of the frame body 20 corresponding to the cavity 31 is etched (step SC5). The etching is continued until the thickness of the film body 22 has a desired value (in other words, until the depth of the hollow portion 21 in the Z direction has the desired value.). By performing the process of step SC1, the slit 25 with a depth equal to or greater than the desired thickness of the film body 22 has already been formed. Therefore, when the film body 22 with the desired thickness and the hollow portion 21 are formed by means of the etching in step SC5, the slit 25 communicates with the hollow portion 21 and only one portion of the outer edge 22a of the film body 22 is supported by the frame body 20.

While the etching of step SC5 is performed, the flow of gas between the cavity 31 and the external space of the laminated structure 10 is allowed through the air passage 40A. Similar to the effects obtained in each of the above described embodiments, in the present embodiment, it is possible to suppress the breakage during the formation of the film body 22, further reduce the thickness of the film body 22 compared to a conventional value, or enlarge the area of the film body 22 compared to a conventional value.

Figure 7H:
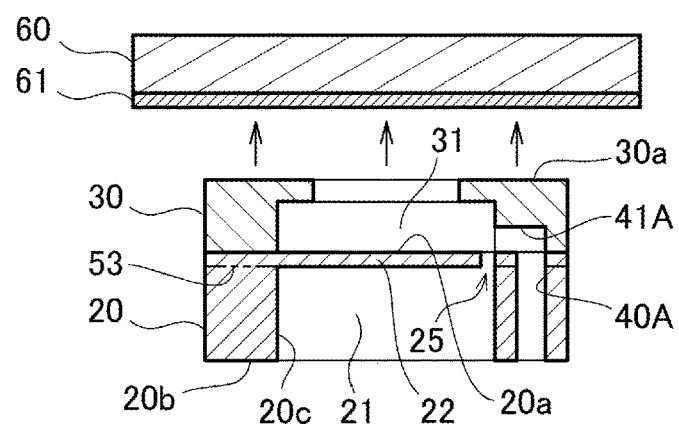
FIG. 7H is a diagram showing one process of the method of manufacturing the laminated structure according to the fourth embodiment.

Next, as shown in FIG. 7H, the support substrate 60 is removed from the lid body 30 (step SC6), and the manufacturing process according to the present embodiment is finished. At this time also, it is possible to suppress the breakage of the film body 22 and safely remove the support substrate 60.

Modified Examples

Figure 8A:
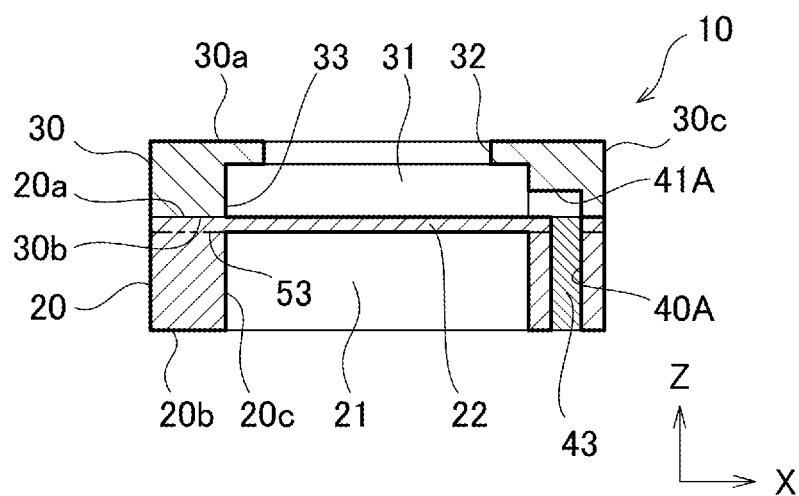
FIG. 8A is a cross-sectional view of a modified example of the laminated structure according to the first embodiment.
Figure 8B:
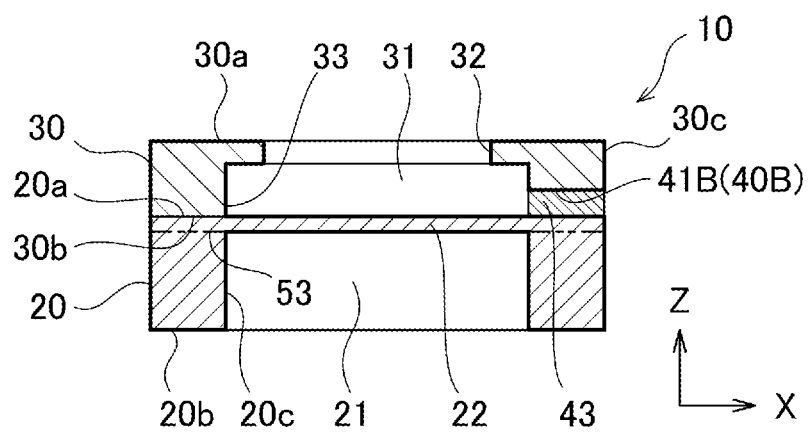
FIG. 8B is a cross-sectional view of a modified example of the laminated structure according to the second embodiment.

FIG. 8A is a cross-sectional view of the laminated structure 10 showing a modified example of the first embodiment, and is a diagram corresponding to FIG. 1B. FIG. 8B is a cross-sectional view of the laminated structure 10 showing a modified example of the second embodiment, and is a diagram corresponding to FIG. 3B. As shown in these diagrams, the air passage 40A or the air passage 40B may be filled by a filling member 43. The filling member 43 is a metal paste or a resin paste and is filled and hardened in the air passage 40A or the air passage 40B.

By filling the air passage 40A (40B) with the filling member 43, it is possible to prevent the entry of foreign matters into the cavity 31. In addition, it is possible to suppress disturbance caused by the flow of gas through the air passage 40A (40B) relative to the motion (vibration and displacement) of the film body 22.

The lid body 30 according to the above first to fourth embodiments is not required to have the opening 32. That is, the cavity 31 is formed so as to open through the opening 33. In addition, the cavity 31 and the film body 22 located therebelow (and a piezoelectric element 81 in the application example) are covered by the front surface 30a of the lid body 30.

Application Example

A description will be given regarding an example applying the laminated structure 10 according to each of the above embodiments to a transducer 80. The transducer 80 forms part of a speaker 90 (see FIG. 10) described later, for example.

Figure 9A:
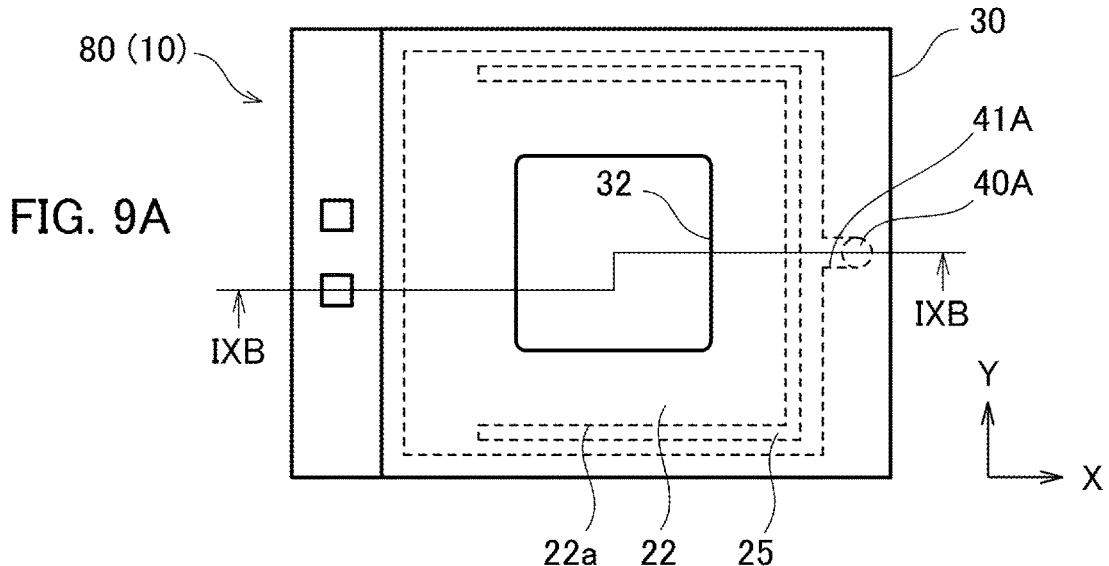
FIG. 9A is a top view of an example of a transducer to which the laminated structure according to the fourth embodiment is applied.
Figure 9B:
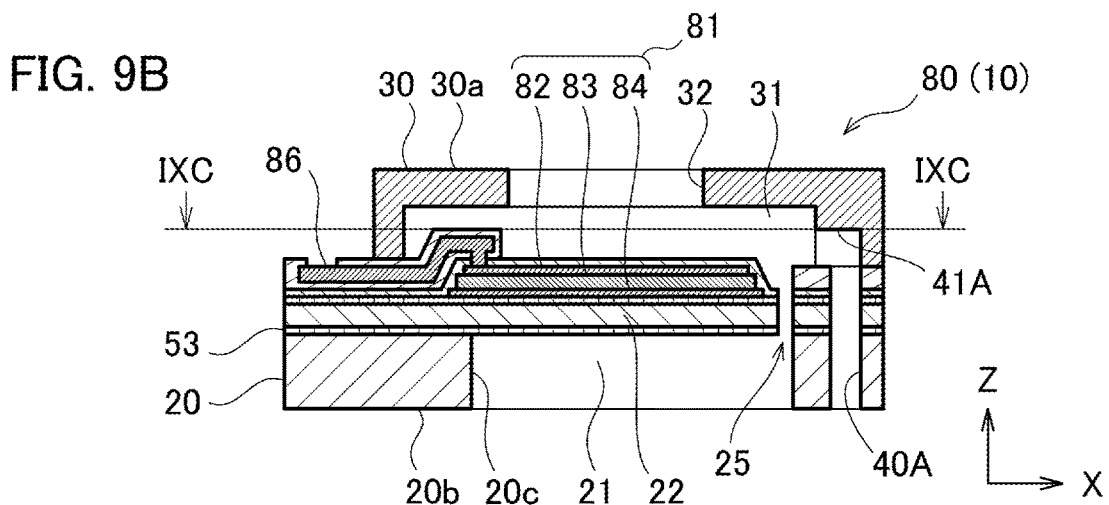
FIG. 9B is a cross-sectional view of the transducer which is taken along line IXB-IXB in FIG. 9A.
Figure 9C:
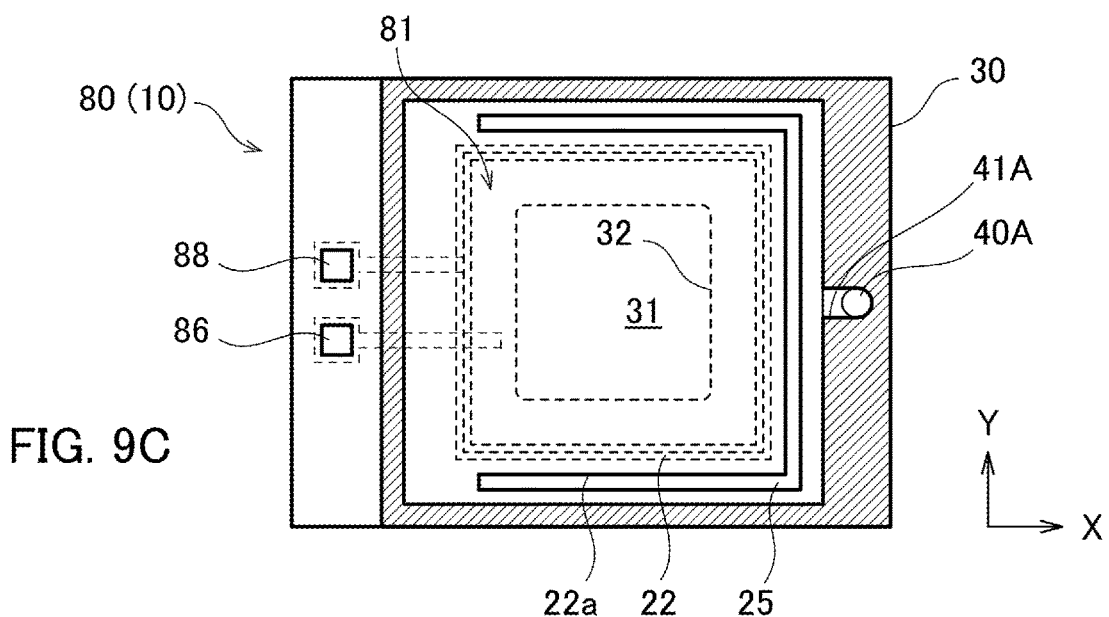
FIG. 9C is a cross-sectional view of the transducer which is taken along line IXC-IXC in FIG. 9B.

FIG. 9A is a top view of the transducer 80, and FIG. 9B is a cross-sectional view of the transducer which is taken along line IXB-IXB in FIG. 9A. FIG. 9C is a cross-sectional view of the transducer which is taken along line IXC-IXC in FIG. 9B. As shown in these diagrams, the laminated structure 10 of the fourth embodiment shown in FIG. 6A is applied to the transducer 80.

As shown in FIG. 9B, the transducer 80 includes a piezoelectric element 81. The piezoelectric element 81 is provided on the film body 22 so as to face the opening 33 of the lid body 30. A part of the piezoelectric element 81 may span across a connection portion between the film body 22 and the frame body 20. In any cases, the entire piezoelectric element 81 faces the opening 33 of the lid body 30.

The piezoelectric element 81 has a pair of electrodes 82 and 84 and a piezoelectric film 83 interposed between the pair of electrodes 82 and 84. The pair of electrodes 82 and 84 and the piezoelectric film 83 have a shape corresponding to the shape of the film body 22.

The electrode 82, the piezoelectric film 83, and the electrode 84 are sequentially laminated on the film body 22 along the direction (the Z direction) from the film body 22 toward the opening 32. The piezoelectric element 81 is formed on the film body 22 before the lid body 30 is attached to the frame body 20 (before the bottomed hole 42 and the slit 25 are formed, if they are formed). When a driving voltage is applied between the pair of electrodes 82 and 84, the film body 22 is displaced due to the stretching and shrinking of the piezoelectric film 83. Specifically, the tip side of the film body 22 is displaced so as to warp along the Z direction.

By repeatedly applying a driving voltage to the pair of electrodes 82 and 84, the film body 22 repeatedly displaces to the hollow portion 21 side and to the cavity 31 side in an alternating manner. Such vibration of the film body 22 causes the air around the film body 22 to vibrate, and sound waves are generated. The sound waves propagate to the external space of the transducer 80 (the laminated structure 10) through the opening 32 of the cavity 31.

The electrodes 82 and 84 are formed of an electrically conductive thin metal film such as platinum, molybdenum, iridium, or titanium, for example. The electrode 82 is located on the top surface of the piezoelectric film 83 and is connected to wiring 86. The electrode 84 is located below the bottom surface of the piezoelectric film 83 and is connected to wiring 88.

The piezoelectric film 83 is made from lead zirconate titanate (PZT), for example. However, the piezoelectric film 83 may be made from aluminum nitride (AlN), zinc oxide (ZnO), or lead titanate ($PbTiO_3$).

Figure 10:
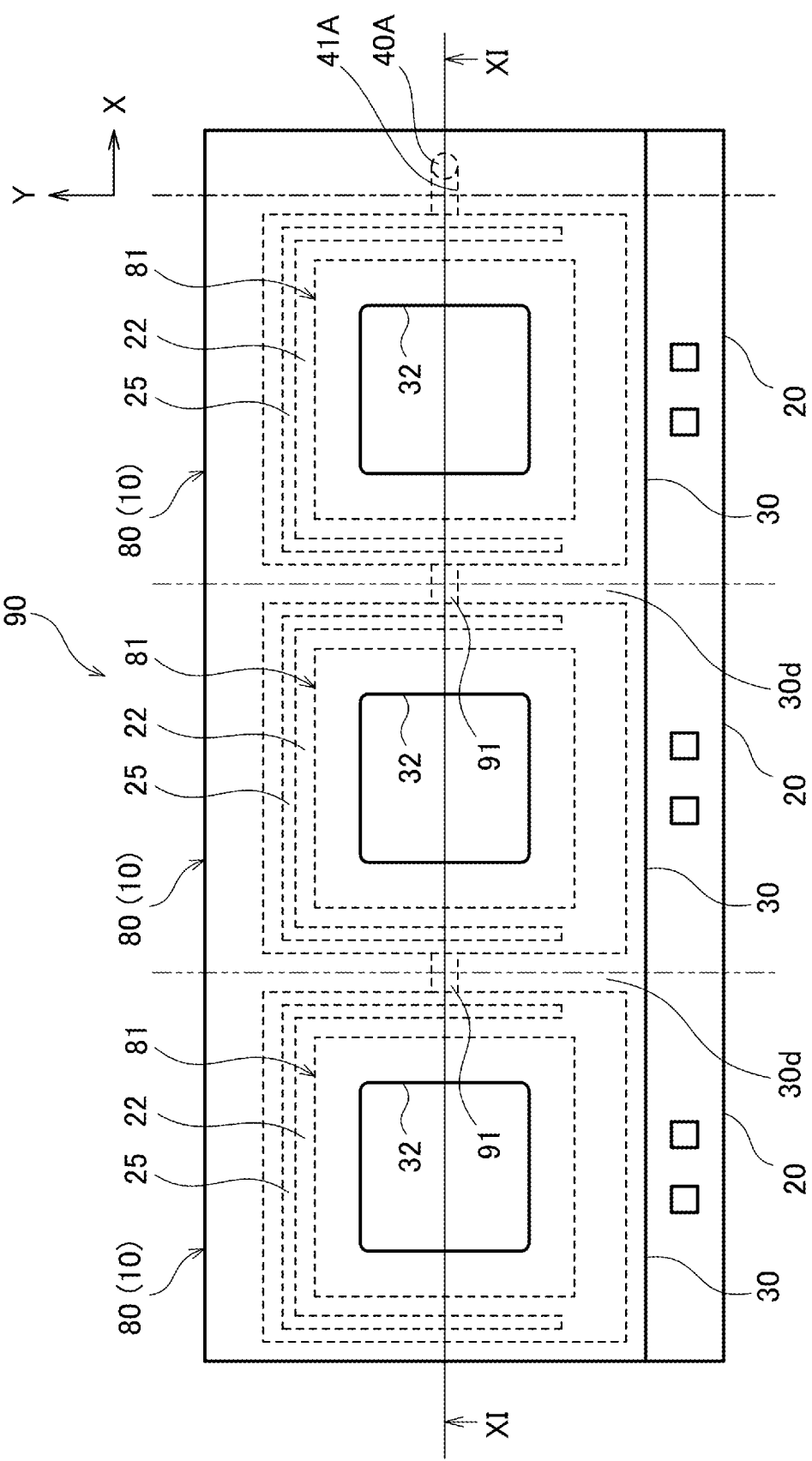
FIG. 10 is a top view of an example of a speaker having a transducer according to the present embodiments.
Figure 11:
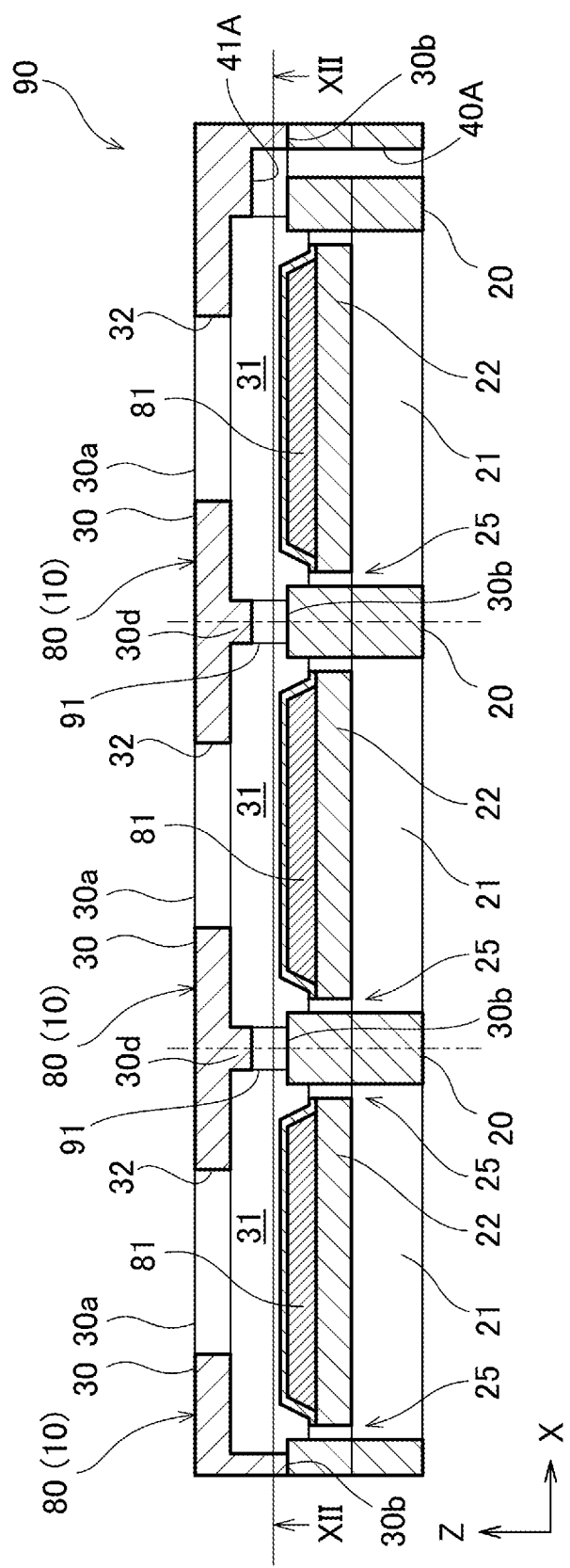
FIG. 11 is a cross-sectional view of the speaker which is taken along line XI-XI in FIG. 10.
Figure 12:
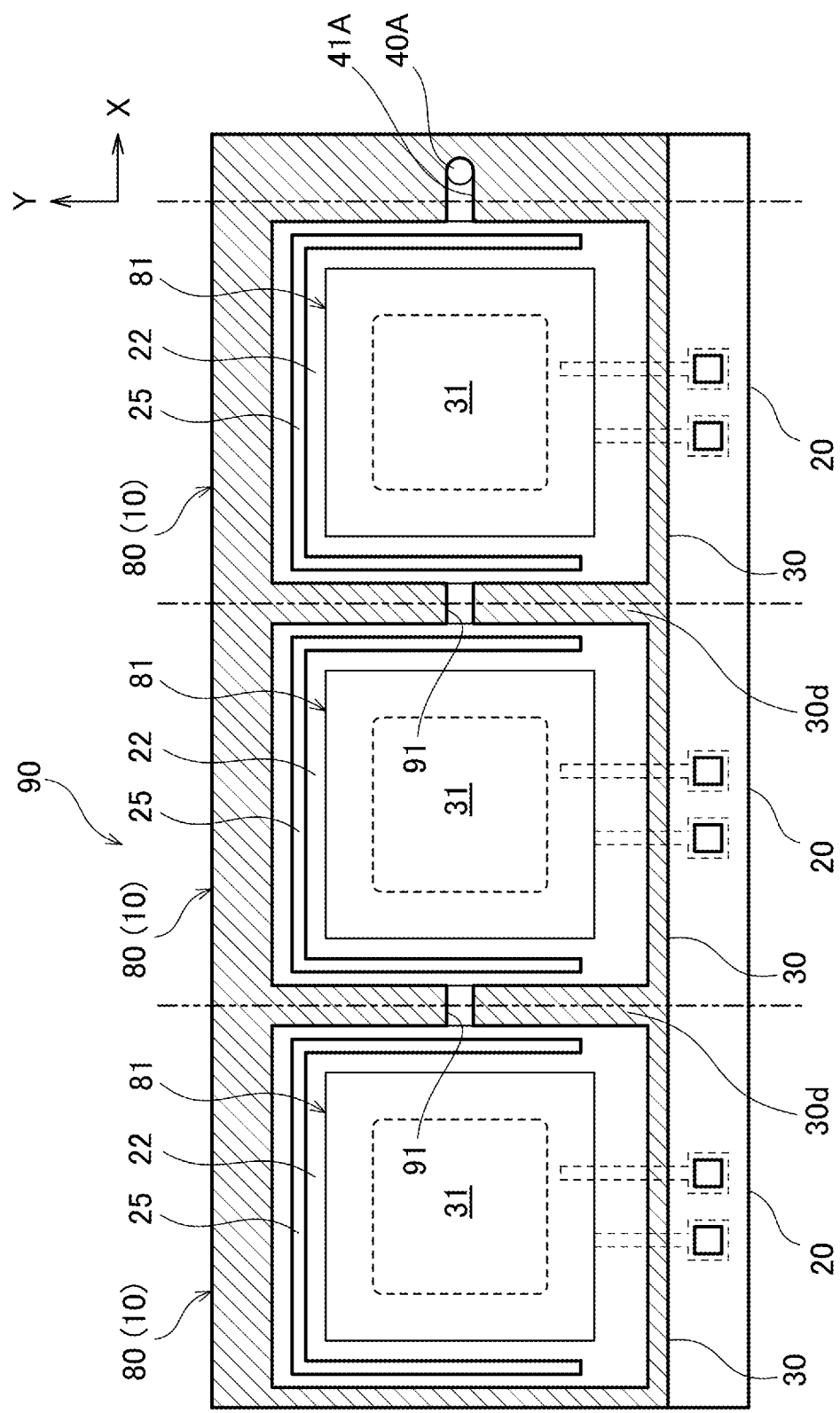
FIG. 12 is a cross-sectional view of the speaker which is taken along line XII-XII in FIG. 11.

A plurality of transducers 80 described above may be arrayed. The plurality of transducers 80 are arrayed in a linear or matrix manner. FIGS. 10 to 12 show an example of the speaker 90 having the plurality of transducers 80, 80, and 80, which are arrayed in a linear manner. FIG. 10 is a top view of the speaker 90, FIG. 11 is a cross-sectional view of the speaker which is taken along line XI-XI in FIG. 10, and FIG. 12 is a cross-sectional view of the speaker which is taken along line XII-XII in FIG. 11.

As shown in FIGS. 10 to 12, each of the lid bodies 30 of the three transducers 80, 80, and 80 is formed as a single structure. In addition, a partition wall 30d between two adjacent transducers among the three transducers 80, 80, and 80 has a communication passage 91 that allows the cavities 31 and 31 (in other words, a first cavity and a second cavity) to communicate. This communication passage 91 is formed as a groove in the back surface 30b of the lid body 30 forming part of each transducer 80. The communication passage 91 allows the flow of gas between the two cavities 31 and 31 adjacent to each other.

As shown in FIG. 11, the speaker 90 has a single groove portion 41A and the air passage 40A that communicates with the groove portion. Note that the speaker 90 may also have a single groove portion 41B (the air passage 40B) (see FIG. 3B). In either case, the groove portion 41A and air passage 40A are, or the air passage 40B is, disposed at the end of an array of the plurality of transducers 80 as shown in FIG. 10, and this allows communication between the cavity 31 of the transducer 80 closest to the end and the external space of the transducer 80, for example.

The configuration of each transducer 80 is the same as the configuration shown in FIGS. 9A to 9C, except that the above communication passages 91 and the plurality of transducers 80 share the single air passage 40A (40B). That is, each transducer 80 has the film body 22 as a source of sound waves and the piezoelectric element 81.

As shown in FIG. 12, the communication passage 91 spatially connects the cavities 31 of the transducers 80. Therefore, when manufacturing the plurality of laminated structures 10 (i.e., the plurality of transducers 80 forming part of the speaker 90) arrayed in one direction, it is possible to increase the number of laminated structures 10 (transducers 80) manufactured per wafer by providing the single air passage 40A (40B) shared by the laminated structures. It is also possible to suppress the breakage during the formation of the film body 22 obtained in each embodiment, reduce the thickness of the film body 22, and enlarge the area of the film body 22.

The invention claimed is:

1. A laminated structure in which a material containing silicon is laminated, the laminated structure comprising:
    a frame body having a first surface and a second surface facing in mutually opposite directions in a thickness direction, the frame body including a film body supported by the frame body and a hollow portion opening at the second surface and located between the film body and the second surface; and
    a lid body attached to the frame body, the lid body including a first cavity located on the film body and an opening which communicates with the first cavity, the opening being formed at a position at which at least a part of the film body is exposed to an external space of the laminated structure, wherein
    the lid body includes a groove portion formed in a surface of the lid body facing the frame body, a second cavity that faces another film body, and a communication passage that communicates the first cavity with the second cavity, and
    the first cavity and the external space of the laminated structure communicate with each other through the groove portion.

2. The laminated structure according to claim 1, wherein the first cavity and the external space of the laminated structure communicate through an air passage that communicates with the groove portion and passes through the frame body.

3. The laminated structure according to claim 2, wherein the air passage is filled by a filling member.

4. The laminated structure according to claim 1, wherein the groove portion extends from the first cavity to the external space of the laminated structure.

5. The laminated structure according to claim 1, further comprising:
    a slit formed in an outer circumference of the film body at the first surface of the frame body.

6. The laminated structure according to claim 1, wherein a part of an outer edge of the film body is supported by the frame body.

7. The laminated structure according to claim 1, wherein an outer edge of the film body is supported by the frame body along a whole circumference.

8. The laminated structure according to claim 1, further comprising:
    a piezoelectric element that is disposed on the film body in the first cavity of the lid body.

9. The laminated structure according to claim 1, wherein a material of the lid body contains silicon.

10. The laminated structure according to claim 1, wherein the groove portion is filled by a filling member.

11. A method of manufacturing a laminated structure in which a material containing silicon is laminated, the method of manufacturing the laminated structure comprising:
    attaching a lid body to a frame body while a first cavity formed in the lid body faces the frame body;
    attaching a support substrate to the lid body; and
    forming a film body at the frame body by etching a second surface of the frame body while a gas is allowed to flow between the first cavity and an external space of the laminated structure, the second surface facing in a direction in a thickness direction of the frame body opposite to a facing direction of a first surface to which the lid body is attached, wherein the lid body includes a groove portion formed in a surface of the lid body facing the frame body, a second cavity that faces another film body, and a communication passage that communicates the first cavity with the second cavity, and the first cavity and the external space of the laminated structure communicate with each other through the groove portion.

12. The method of manufacturing a laminated structure according to claim 11, wherein before forming the film body, an air passage is formed which communicates from the second surface of the frame body to the first cavity through the groove portion.

13. The method of manufacturing the laminated structure according to claim 11, wherein the groove portion extends from the first cavity to the external space of the laminated structure.

14. The method of manufacturing the laminated structure according to claim 11, wherein the first cavity of the lid body is open toward the support substrate.

15. The method of manufacturing the laminated structure according to claim 11, wherein the cavity of the lid body is open toward the support substrate, and an adhesive member and a gap through which the first cavity and the external space of the laminated structure communicate are interposed between the lid body and the support substrate.

16. The method of manufacturing the laminated structure according to claim 11, wherein before forming the film body, a slit is formed in a part of an outer circumference of an area where the film body is formed at the frame body.

* * * * *